(12) United States Patent
Yoshida et al.

(10) Patent No.: US 12,264,949 B2
(45) Date of Patent: Apr. 1, 2025

(54) GAS FLOW ESTIMATION METHOD, HOLE DIAMETER ESTIMATION METHOD, GAS FLOW RATE ESTIMATION DEVICE, AND HOLE DIAMETER ESTIMATION DEVICE

(71) Applicants: NATIONAL INSTITUTE OF ADVANCED INDUSTRIAL SCIENCE AND TECHNOLOGY, Tokyo (JP); FUKUDA CO., LTD., Tokyo (JP)

(72) Inventors: Hajime Yoshida, Tsukuba (JP); Yoshinori Takei, Tsukuba (JP); Kenta Arai, Tsukuba (JP); Mao Hirata, Tokyo (JP); Tsutomu Hara, Tokyo (JP); Jun Inomata, Tokyo (JP)

(73) Assignees: NATIONAL INSTITUTE OF ADVANCED INDUSTRIAL SCIENCE AND TECHNOLOGY, Tokyo (JP); FUKUDA CO., LTD., Tokyo (JP)

( * ) Notice: Subject to any disclaimer, the term of this patent is extended or adjusted under 35 U.S.C. 154(b) by 269 days.

(21) Appl. No.: 17/764,304

(22) PCT Filed: Oct. 16, 2020

(86) PCT No.: PCT/JP2020/039118
§ 371 (c)(1),
(2) Date: Mar. 28, 2022

(87) PCT Pub. No.: WO2021/079833
PCT Pub. Date: Apr. 29, 2021

(65) Prior Publication Data
US 2022/0349735 A1 Nov. 3, 2022

(30) Foreign Application Priority Data
Oct. 25, 2019 (JP) .................................. 2019-194488

(51) Int. Cl.
*G06F 11/30* (2006.01)
*G01F 1/34* (2006.01)
(Continued)

(52) U.S. Cl.
CPC .................. *G01F 1/34* (2013.01); *G01M 3/28* (2013.01); *G06F 2113/08* (2020.01)

(58) Field of Classification Search
CPC ........................................................ G01F 1/34
See application file for complete search history.

(56) References Cited

U.S. PATENT DOCUMENTS 5,115,687 A * 5/1992 Clingman, Jr. ...... G01N 33/225
73/863.61
2010/0198532 A1 8/2010 Gerwin et al.

FOREIGN PATENT DOCUMENTS

JP 2003-270077 A 9/2003
JP 2004-020524 A 1/2004

OTHER PUBLICATIONS

PCT/ISA/210, "International Search Report for International Application No. PCT/JP2020/039118," Dec. 28, 2020.
(Continued)

*Primary Examiner* — Phuong Huynh
(74) *Attorney, Agent, or Firm* — HAUPTMAN HAM, LLP

(57) ABSTRACT

A flow rate of a gas is determined based on a predetermined relational expression including, as parameters: the flow rate of the gas; diameter and length of a hole; upstream and downstream pressures; and temperature, molecular weight, viscosity coefficient, and specific heat ratio of the gas. Additionally, setting conditions for a type and temperature of the gas, the length of the hole, and the pressures upstream and downstream from the hole are set; the relational expression is used to obtain the correspondence relationship (Continued)

between the diameter of the hole and the flow rate of the gas flowing through the hole; an approximation function approximating the obtained correspondence relationship is determined; the flow rate of a gas passing through a test piece having a hole of an unknown diameter is measured; and the diameter of the hole is estimated, based on the measured flow rate and the approximation function.

12 Claims, 4 Drawing Sheets

(51) Int. Cl.
*G01M 3/28* (2006.01)
*G06F 113/08* (2020.01)

(56) References Cited

OTHER PUBLICATIONS

R.G. Livesey, "Method for calculation of gas flow in the whole pressure regime through ducts of any length," Journal of Vaccuum Science & Technology A, vol. 19, 2001, pp. 1674.

R.G. Livesey, "Solution methods for gas flow in ducts through the whole pressure regime," Vacuum, vol. 76, Oct. 29, 2004, pp. 101-107.

Donald J. Santeler, "New concepts in molecular gas flow," Journal of Vacuum Science & Technology A, vol. 4, 1986, pp. 338-343.

European Patent Office "Partial Supplementary European Search Report for European Patent Application No. 20879175.6," Oct. 16, 2023.

Extended European Search Report for European Application No. 24180831.0 dated Oct. 22, 2024, 6 pp.

* cited by examiner

GAS FLOW ESTIMATION METHOD, HOLE DIAMETER ESTIMATION METHOD, GAS FLOW RATE ESTIMATION DEVICE, AND HOLE DIAMETER ESTIMATION DEVICE

RELATED APPLICATIONS

The present application is National Phase of International Application No. PCT/JP2020/039118 filed Oct. 16, 2020, and claims priority from Japanese Application No. 2019-194488, filed Oct. 25, 2019, the disclosure of which is hereby incorporated by reference herein in its entirety.

TECHNICAL FIELD

The present invention relates to a method of estimating a flow or flow rate of gas from a hole diameter by means of a relational expression between a flow or flow rate of the gas flowing through a hole and a diameter of the hole, regardless of the state of flow of the gas, and a method of and a device for estimating the hole diameter from the flow or flow rate of the gas by means of the relational expression.

BACKGROUND ART

In the prior art, leakage test using a test gas, such as pressure change method (air leakage test) and helium leakage test, is performed in the many industrial fields for the purpose of protecting contents from water vapor, oxygen, and invasion of microorganisms in pharmaceutical packaging and food packaging, for the purpose of ensuring product quality and long-term stability in the fields of automobile parts and electronic parts, and the like. In the pressure change method, leakage is detected by pressurizing or depressurizing an inside of a test piece with test gas and measuring a pressure change inside the test piece due to leakage. In the helium leakage test, helium is used as the test gas and a helium detector is used to detect the leakage.

In the leakage test using the pressure change method, an amount of leakage can also be measured from change in pressure. For example, PTL1 discloses a leakage tester that detects leakage of gas inside an object to be measured by causing a differential pressure sensor to detect the pressure difference between pressure of a pressurized gas supplied from a pressurized gas source for supplying the pressurized gas and pressure of the gas inside the object to be measured. The leakage tester calculates an amount of leakage of the gas inside the object to be measured, based on the differential pressure detected by the differential pressure sensor and the internal volume of the object to be measured obtained by input or measurement.

CITATION LIST

Patent Literature

PTL1: Japanese Unexamined Patent Publication No. 2003-270077

Non Patent Literature

NPL1: R. G. Livesey, "Method for calculation of gas flow in the whole pressure regime through ducts of any length", Journal of Vacuum Science & Technology A, vol. 19, 2001, pp 1674

NPL2: R. G. Livesey, "Solution methods for gas flow in ducts through the whole pressure regime", Vacuum, vol. 76, Oct. 29, 2004, pp 101-107

NPL3: Donald J. Santeler, "New concepts in molecular gas flow", Journal of Vacuum Science & Technology A, vol. 4, 1986, pp 338-343

SUMMARY OF INVENTION

Technical Problem

In pharmaceutical packaging and the like, quality is managed by qualitative leakage tests such as submersion tests, liquid leakage tests, and microbial ingress tests. However, in the qualitative leakage tests, there is a problem in that dispersion is generated in the measurement conditions and measurement results, and the scientific validity of the results and the basis of the evaluation criteria are unclear. Therefore, there has been an increase in the demand for a quantitative leakage test in which the amount of leakage is quantitatively determined as a value of the gas flow rate of the gas flowing through the leakage hole. Further, in order to establish a standard for an acceptable leakage hole, it is desirable that the maximum allowable limit of the amount of leakage of the gas can be obtained and the allowable hole diameter can be determined from this maximum allowable limit. Therefore, in order to establish a quantitative leakage test, it is desired that the amount of leakage of the gas, that is, the flow rate of the gas can be estimated from the shape of the leakage hole (particularly, the diameter of the leakage hole) under specific gas type, pressure condition and so on. On the contrary, it is also desired that the shape (particularly the diameter) of the leakage hole can be estimated from the amount of leakage of the gas, that is, the flow rate of the gas. In other words, there is a demand for associating the shape of the leakage hole, particularly the diameter of the leakage hole, with the amount of leakage of the gas, that is, the flow rate of the gas.

On the other hand, for example, it is not easy to determine the gas flow rate of the gas passing through the cylindrical conduit, based on the shape of the cylindrical conduit, even in a steady state. This is because the characteristics of the flow of the gas change depending on the pressure, the type and temperature of the gas, the shape (diameter and length) of the cylindrical conduit, and the like. The flow of the gas is divided into at least six types of flow regions having different characteristics, such as molecular flow, intermediate flow including slip flow, laminar flow, turbulent flow, critical flow, and subcritical flow. The laminar flow, turbulent flow, critical flow, and subcritical flow may be collectively referred to as continuous flow. Similarly, the critical flow and subcritical flow may be collectively referred to as compressible flow. As described above, since the flow of the gas exhibits different characteristics in the plurality of regions, a calculation expression for the gas flow rate changes depending on the flow region.

Further, in the prior art, not only the expression for theoretically calculating the flow rate, but also the calculation expression for calculating the flow rate from the shape of the hole and various conditions of the flow of the gas on the basis of the empirical value of the actually obtained flow rate has been proposed as an empirical formula or a semi-empirical formula. However, since such empirical formulas and semi-empirical formulas have been proposed specifically for the flow regions of interest in each industrial field, there are few calculation expressions applicable to all flow regions.

In view of the circumstances, in order to calculate the flow rate from the shape of the hole and various conditions of the flow of the gas, it was necessary to determine the state of flow of the gas such as molecular flow, laminar flow, and turbulent flow before calculating the flow rate of the gas and then use a calculation expression suitable for the state of the flow of the gas. Therefore, there is a problem in that an erroneous calculation result is obtained, if the state of the flow is erroneously determined and an inappropriate calculation expression is used to calculate the flow rate of the gas. Further, for example, in NPL1 and NPL2, a calculation method applicable to all flow regions has been proposed. However, there is a problem in that a complicated procedure including iterative calculation is necessary. For this reason, it was not easy to associate the flow rate of the gas flowing through the hole with the diameter of the hole.

Accordingly, it is an object of the present invention to solve the problems existing in the prior art and to associate a flow rate of gas with a diameter of a hole without determining a state of the flow of the gas by means of a relational expression which is applicable regardless of the state of the flow of the gas.

Solution to Problem

In view of the above-described object, the present invention provides, as a first aspect, a gas flow rate estimation method for determining a flow rate of gas flowing through a hole, based on a type of the gas flowing through the hole, pressures upstream and downstream from the hole, and information about the hole, in which the flow rate of the gas is determined, regardless of a state of flow of the gas, from a molecular weight, a viscosity coefficient, and a specific heat ratio of the gas, a diameter and a length of the hole, and the upstream and downstream pressures of the gas flowing through the hole, based on a predetermined relational expression including, as parameters, all of the flow rate of the gas, the diameter and length of the hole, the upstream and downstream pressures of the hole, a temperature of the gas, the molecular weight of the gas, the viscosity coefficient of the gas, and the specific heat ratio of the gas.

In the above-described gas flow rate estimation method, it is preferable that the relational expression includes Qc represented by the following expression:

[Math. 1]

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

where Qc is the flow rate of the gas under assumption of continuous flow, $Q_{VL}$ is the flow rate of the gas under assumption of laminar flow, $Q_{TB}$ is the flow rate of the gas under assumption of turbulent flow, and $Q_{CF}'$ is the flow rate of the gas under assumption of compressible flow. It is more preferable that the relational expression includes Qc represented by the following expressions:

[Math. 2]

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

[Math. 3]

$$Q_{TB} = 1.015 d^{19/7} \left(\frac{\bar{v}^6}{\eta}\right)^{1/7} \left(\frac{p_u^2 - p_d^2}{l + nd}\right)^{4/7}$$

$$\bar{v} = \sqrt{\frac{8RT}{\pi M}}$$

$$Q_{VL} = \frac{\pi d^4}{256 \eta (l + nd)} (p_u^2 - p_d^2)$$

$$Q'_{CF} = Q_{CF} - x$$

when $\left(\frac{p_d}{p_u}\right) \leq \left(\frac{2}{\gamma + 1}\right)^{\frac{\gamma}{\gamma - 1}}$ $$Q_{CF} = \frac{C_d p_u \pi d^2}{4} \sqrt{\frac{RT}{M} \gamma \left(\frac{2}{\gamma + 1}\right)^{\frac{\gamma + 1}{\gamma - 1}}}$$

when $\left(\frac{p_d}{p_u}\right) > \left(\frac{2}{\gamma + 1}\right)^{\frac{\gamma}{\gamma - 1}}$ $$(Q)_{CF} = \frac{C_d p_u \pi d^2}{4} \sqrt{\frac{RT}{M} \frac{2\gamma}{\gamma - 1} \left[\left(\frac{p_d}{p_u}\right)^{\frac{2}{\gamma}} - \left(\frac{p_d}{p_u}\right)^{\frac{\gamma + 1}{\gamma}}\right]},$$

where Qc is the flow rate of the gas under assumption of continuous flow, d is the diameter of the hole, l is the length of the hole, T is the temperature of the gas, M is the molecular weight of the gas, η is the viscosity coefficient of the gas, γ is the specific heat ratio of the gas, $P_u$ is the upstream pressure of the hole, $P_d$ is the downstream pressure of the hole, $C_d$ is a discharge coefficient, R is a gas constant, and n and x are correction coefficients.

More preferably, the relational expression is the following expression:

[Math. 4]

$$Q = Q_C + Q_M \frac{1 + \sqrt{\frac{M}{RT}} \frac{d\bar{p}}{\eta}}{1 + 1.235 \sqrt{\frac{M}{RT}} \frac{d\bar{p}}{\eta}}$$

$$\bar{p} = \frac{p_u + p_d}{2}$$

$$Q_M = \frac{\pi d^2}{16} \sqrt{\frac{8RT}{\pi M}} \cdot \frac{4(l/d) + 14}{3(l/d)^2 + 18(l/d) + 14} (p_u - p_d).$$

For example, the gas is selected from a group consisting of air, helium, hydrogen, oxygen, and nitrogen.

The present invention also provides, as the second aspect, a hole diameter estimation method for determining a diameter of a hole, based on a type and a temperature of gas flowing through the hole, pressures upstream and downstream from the hole, and a flow rate of the gas flowing through the hole, the hole diameter estimation method including: a step of obtaining a correspondence relationship between the diameter of the hole and the flow rate of the gas flowing through the hole, by setting setting conditions of the type and temperature of the gas, a length of the hole, and the upstream and downstream pressures of the hole, and using the relational expression used in the first aspect of the present invention under the setting conditions; a step of determining an approximation function approximating the correspondence relationship, which is obtained under the setting conditions, between the diameter of the hole and the flow rate of the gas flowing through the hole; a step of providing a test piece having a hole of an unknown diameter; a step of measuring the flow rate of the gas passing through the hole of the test piece under the setting conditions; and a step of estimating the diameter of the hole, based on the measured flow rate of the gas and the approximation function.

Regarding the above-described hole diameter estimation method, in the step of obtaining the correspondence relationship, the type and temperature of the gas and the length of the hole may be set in advance, and the relational expression may be used to obtain the correspondence relationships between the diameter of the hole and the flow rate of the gas flowing through the hole under a plurality of combinations of the upstream and downstream pressures of the hole, and in the step of determining the approximation function, the approximation function approximating each of the correspondence relationships, which are obtained under the plurality of combinations of the upstream and downstream pressures of the hole, between the diameter of the hole and the gas flowing through the hole, may be determined, and the hole diameter estimation method further includes a step of, in a case where an unknown number m of holes having the length is formed in the test piece, using the set type of the gas and measuring the flow rate of the gas passing through the holes of the test piece for the plurality of combinations of the upstream and downstream pressures, under the set temperature of the gas, thereby determining the diameter of the holes by using the approximation function under assumption that a value, obtained by dividing each flow rate measured for each of the combinations of the upstream and downstream pressures by m, is defined as a flow rate per hole to estimate m as the number of the holes when a difference between a maximum value and a minimum value of the diameters of the holes determined in each combination is equal to or less than a predefined threshold value.

The present invention further provides, as a third aspect, a gas flow rate estimation device for determining a flow rate of gas flowing through a hole from a type of the gas flowing through the hole, pressures upstream and downstream from the hole, and information about the hole, the gas flow rate estimation device including: a gas type setting unit configured to set a molecular weight of the gas, a viscosity coefficient of the gas, and a specific heat ratio of the gas, based on a selected type of the gas; a gas temperature setting unit configured to set a temperature of the gas; a hole length setting unit configured to set a length of the hole; a hole diameter setting unit configured to set a diameter of the hole; a pressure setting unit configured to set the pressures upstream and downstream from the hole; a storage unit configured to store the relational expression used in the above-described gas flow rate estimation method; and a gas flow rate estimation unit configured to use the relational expression stored in the storage unit to estimate the flow rate of the gas flowing through the hole, based on the molecular weight of the gas, the viscosity coefficient and the specific heat ratio of the gas of the type set by the gas type setting unit, the temperature set by the gas temperature setting unit, the length of the hole set by the hole length setting unit, the diameter of the hole set by the hole diameter setting unit, and the pressures upstream and downstream from the hole set by the pressure setting unit.

The present invention further provides, as a fourth aspect, a hole diameter estimation device for estimating a diameter of a hole formed in a test piece, the hole diameter estimation device including: a gas type setting unit configured to set a molecular weight of gas, a viscosity coefficient of the gas, and a specific heat ratio of the gas, based on a selected type of the gas; a gas temperature setting unit configured to set a temperature of the gas; a hole length setting unit configured to set a length of the hole; a pressure setting unit configured to set pressures upstream and downstream from the hole; a storage unit configured to store an approximation function approximating a correspondence relationship between the diameter of the hole and a flow rate of the gas flowing through the hole, the correspondence relationship being obtained by using the relational expression used in the above-described gas flow rate estimation method under setting conditions of the molecular weight of the gas, the viscosity coefficient and the specific heat ratio of the gas of the type set by the gas type setting unit, the temperature set by the gas temperature setting unit, the length of the hole set by the hole length setting unit, and the upstream and downstream pressures of the hole set by the pressure setting unit; a flow rate measurement unit configured to measure the flow rate of the gas passing through the hole of the test piece in a state where the upstream and downstream pressures set in the pressure setting unit are generated inside and outside the test piece, by placing the test piece inside the flow rate measurement unit and using the selected type of the gas at the temperature set in the gas temperature setting unit; and a hole diameter estimation unit configured to estimate the diameter of the hole, based on the flow rate measured by the flow rate measurement unit under the setting conditions and the approximation function stored in the storage unit.

In the hole diameter estimation device, the storage unit may store the approximation function approximating the correspondence relationship between the diameter of the hole and the flow rate of the gas flowing through the hole for each of a plurality of combinations of the upstream and downstream pressures of the hole set by the pressure setting unit, the correspondence relationship being obtained by using the relational expression under setting conditions of the molecular weight, the viscosity coefficient and the specific heat ratio of the gas of the type set by the gas type setting unit, the temperature set by the gas temperature setting unit, and the length of the hole set by the hole length setting unit, and in a case where an unknown number m of holes having the length is formed in the test piece, the hole diameter estimation unit may use the selected type of the gas at the temperature set in the gas temperature setting unit and measure the flow rate of the gas passing through the holes of the test piece under the plurality of combinations of the upstream and downstream pressures, thereby determining the diameter of the holes by using the approximation function under assumption that a value, obtained by dividing each flow rate measured in each combination of the upstream and downstream pressures by m, is defined as a flow rate per hole to estimate m as the number of the holes when a difference between a maximum value and a minimum value of the diameter of the holes determined in each combination is equal to or less than a predefined threshold value.

Advantageous Effect of Invention

According to the present invention, the relational expression for determining the flow rate of the gas passing through the hole includes all parameters which are necessary to calculate the flow rate in states of the flow, that is, in regions of flow having different characteristics such as molecular flow, intermediate flow including slip flow, laminar flow, turbulent flow, critical flow, and subcritical flow. The parameters include the molecular weight, viscosity coefficient, and specific heat ratio of the gas, which are factors that affect the flow of the gas, the temperature of the gas, the length and the diameter of the hole, and the upstream and downstream pressures of the hole. Therefore, the relational expression can be defined so as to be applicable in the regions of flow having different characteristics such as molecular flow, intermediate flow, laminar flow, turbulent flow, critical flow, and subcritical flow, while reflecting the difference in conditions about the type of gas and the temperature. Further, since the flow rate is calculated by means of the relational expression that is applicable regardless of the state of the flow, it is not necessary to determine the state of the flow when the flow rate is calculated, and complicated iterative calculation is not necessary. Furthermore, if the above-described parameters including the diameter of the hole are specified, the flow rate can be determined without determining the state of the flow by means of the relational expression. Therefore, it is possible to easily associate the flow rate with the diameter of the hole.

DESCRIPTION OF EMBODIMENTS

Figure 1:
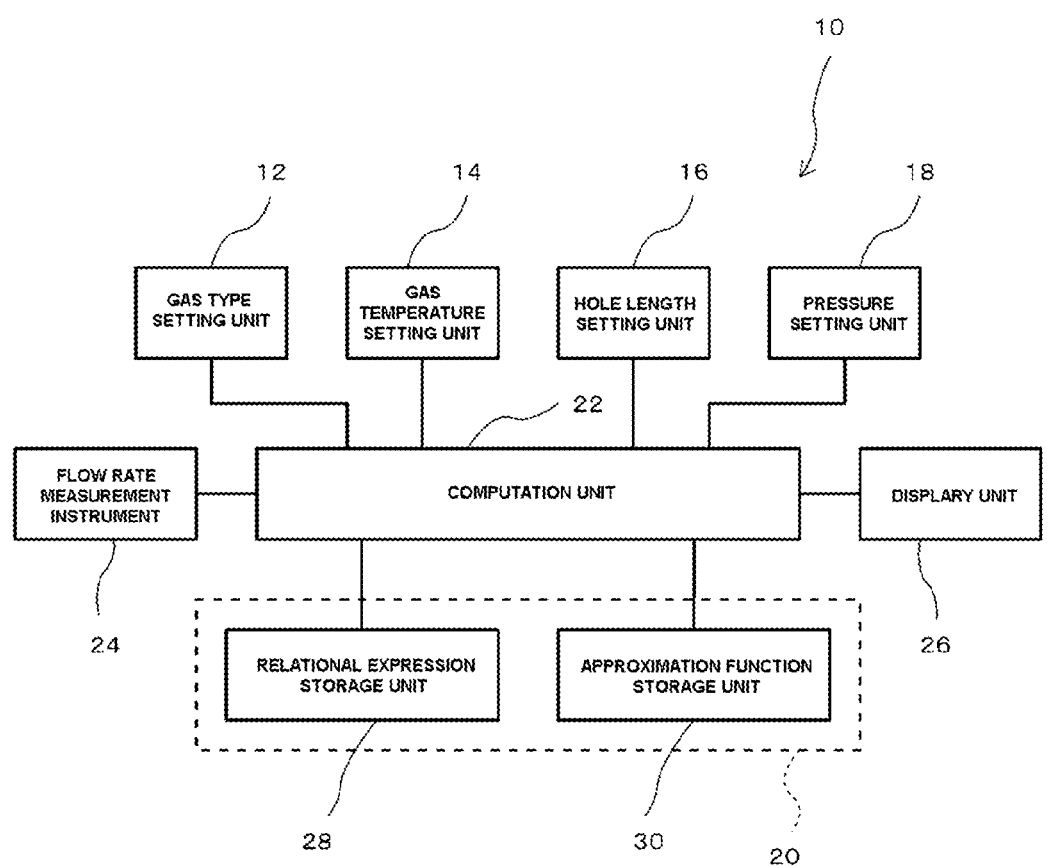
FIG. 1 is a block diagram showing an overall configuration of a hole diameter estimation device using a gas flow rate estimation method according to the present invention.

Embodiments of a gas flow rate estimation method, a hole diameter estimation method using the gas flow rate estimation method, and a hole diameter estimation device according to the present invention will be described below, with reference to the drawings.

First, the gas flow rate estimation method according to the present invention will be described. In the gas flow rate estimation method according to the present invention, a flow rate flowing through a hole is estimated by using a relational expression that combines calculation expressions for calculating a flow rate in molecular flow, laminar flow, turbulent flow, critical flow, and subcritical flow when the gas having a molecular weight M, a viscosity coefficient $\eta$[Pa·s], a specific heat ratio $\gamma$, and a temperature T[K] flows through the hole having a diameter d[m] and a length l[m] under a condition of an upstream pressure $P_u$[Pa] and a downstream pressure $P_d$[Pa] of the hole. The used relational expression includes eight parameters of the molecular weight M, the viscosity coefficient $\eta$, the specific heat ratio $\gamma$, and the temperature T of the gas, the diameter d and the length l of the hole, and the upstream pressure $P_u$ and the downstream pressure $P_d$ of the hole. As the relational expression, for example, the following Relational Expression (1) is used. Here, R is a gas constant, x is an optional correction coefficient, and $C_d$ is a discharge coefficient. Further, n is a correction coefficient of a real number in the range of 0 to 1, and is preferably 0.41.

[Math. 5]

$$Q = Q_C + Q_M \frac{1 + \sqrt{\frac{M}{RT}} \frac{d\bar{p}}{\eta}}{1 + 1.235 \sqrt{\frac{M}{RT}} \frac{d\bar{p}}{\eta}} \quad (1)$$

$$\bar{p} = \frac{p_u + p_d}{2}$$

$$Q_M = \frac{\pi d^2}{16} \sqrt{\frac{8RT}{\pi M}} \cdot \frac{4(l/d) + 14}{3(l/d)^2 + 18(l/d) + 14}(p_u - p_d)$$

[Math. 6]

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}}$$

[Math. 7]

$$Q_{TB} = 1.015 d^{19/7} \left(\frac{\bar{v}^6}{\eta}\right)^{1/7} \left(\frac{p_u^2 - p_d^2}{l + nd}\right)^{4/7}$$

$$\bar{v} = \sqrt{\frac{8RT}{\pi M}}$$

$$Q_{VL} = \frac{\pi d^4}{256\eta(l + nd)}(p_u^2 - p_d^2)$$

$$Q'_{CF} = Q_{CF} - x$$

when $\left(\frac{p_d}{p_u}\right) \leq \left(\frac{2}{\gamma + 1}\right)^{\frac{\gamma}{\gamma-1}}$ $$(Q)_{CF} = \frac{C_d p_u \pi d^2}{4} \sqrt{\frac{RT}{M} \gamma \left(\frac{2}{\gamma + 1}\right)^{\frac{\gamma+1}{\gamma-1}}}$$

when $\left(\frac{p_d}{p_u}\right) > \left(\frac{2}{\gamma + 1}\right)^{\frac{\gamma}{\gamma-1}}$ $$Q_{CF} = \frac{C_d p_u \pi d^2}{4} \sqrt{\frac{RT}{M} \frac{2\gamma}{\gamma - 1} \left[\left(\frac{p_d}{p_u}\right)^{\frac{2}{\gamma}} - \left(\frac{p_d}{p_u}\right)^{\frac{\gamma+1}{\gamma}}\right]}$$

Relational Expression (1) is a combination of calculation expressions for calculating the flow rates in molecular flow, laminar flow, turbulent flow, critical flow, and subcritical flow. Therefore, by using Relational Expression (1), the flow rate Q can be estimated without determining which state of the molecular flow, laminar flow, turbulent flow, critical flow, subcritical flow, or the like the flow of the gas is in.

Further, by using the above-described gas flow rate estimation method and measuring a flow rate Q [Pa·m³/s] of gas which flows through a hole of a test piece having an unknown diameter, the diameter d[m] of the hole of the test piece can be estimated in the following procedure in accordance with the hole diameter estimation method according to the present invention. Here, gas having the molecular weight M, the viscosity coefficient $\eta$[Pa·s], the specific heat ratio $\gamma$, and the temperature T[K] is used, and the flow rate Q of the gas which flows through the hole having the length l[m] in the test piece having the thickness W[m] is measured under the condition of the upstream pressure $P_u$[Pa] and the downstream pressure $P_d$[Pa] of the hole.

In the hole diameter estimation method according to the present invention, in addition to the measurement of the flow rate of the gas which passes through the hole of the test piece, an approximation function approximating a correspondence relationship between the diameter of the hole and the flow rate of the gas which flows through the hole is determined under each of one or a plurality of combinations of the upstream pressure $P_u$ and the downstream pressure of the hole. Specifically, under the condition that gas having the same type and temperature as the type and the temperature of the gas used when measuring the flow rate of the gas which flows through the hole of the test piece is used and the upstream and downstream pressures are set the same as the pressures when measuring the flow rate of the hole of the test piece, that is, by using the values of the molecular weight M, viscosity coefficient η, specific heat ratio γ, and temperature T of the gas used when measuring the flow rate of the gas which flows through the hole of the test piece, and the values of the upstream pressure $P_u$ and the downstream pressure $P_d$ at the time of measurement, as well as, under assumption that the length l of the hole of the test piece is equal to the thickness W of the test piece, the correspondence relationship between the diameter d of the hole and the flow rate Q of the gas which flows through the hole is obtained by means of Relational Expression (1) while changing the value of the diameter d of the hole. Next, the approximation function approximating the obtained correspondence relationship between the diameter d and the flow rate Q of the gas is determined. The correspondence relationship between the diameter d and the gas flow rate Q can be approximated by, for example, a power function.

On the other hand, the test piece having the thickness W is actually used to measure the flow rate Q of the gas, which flows through the hole of the test piece and has the molecular weight M, the viscosity coefficient η, the specific heat ratio γ, and the temperature T, under the condition that the upstream pressure $P_u$ and the downstream pressure $P_d$ are generated inside and outside the hole of the test piece.

Next, under assumption that the length l of the hole of the test piece is equal to the thickness W of the test piece, the diameter d of the hole is estimated, based on the flow rate Q actually measured using the test piece and the approximation function, determined as described above, of the correspondence relationship between the diameter d of the hole and the flow rate Q of the gas.

In a case where the test piece has an unknown number m of holes, the test piece is used to measure the flow rate Q of the gas, which flows through the holes of the test piece and has the molecular weight M, the viscosity coefficient η, the specific heat ratio γ, and the temperature T, for a plurality of combinations of the upstream pressure $P_u$ and the downstream pressure $P_d$. Further, under assumption that the length l of each of the holes of the test piece is equal to the thickness W of the test piece, the correspondence relationships between the diameter d of the holes and the flow rate Q of the gas which flows through the holes are obtained by using Relational Expression (1) while changing the value of the diameter d of the holes, as well as, by using the same values of the molecular weight M, viscosity coefficient η, specific heat ratio γ, and temperature T as those of the gas used when measuring the flow rate of the gas which flows through the holes of the test piece, for the plurality of combinations of the upstream pressure $P_u$ and the downstream pressure $P_d$ which are the same as the pressures when the test piece is used to measure the flow rate Q, and approximation functions are determined for the obtained correspondence relationships, respectively. Next, under assumption that the number of the holes is m, for each of the plurality of combinations of the upstream pressure $P_u$ and the downstream pressure $P_d$, a value obtained by dividing the flow rate Q actually obtained using the test piece by m is defined as a flow rate per hole, and the diameter of the holes is determined by means of the approximation function corresponding to each combination of the upstream pressure $P_u$ and the downstream pressure $P_d$, while increasing the number of m by 1 from 1. Then, m is estimated as the number of the holes, when a difference between a maximum value and a minimum value of the diameter of the holes determined for each combination of the upstream pressure $P_u$ and the downstream pressure $P_d$ is equal to or less than a predetermined threshold. In addition, an average value of the diameters of the holes (the diameters of the holes determined under each combination of the upstream pressure $P_u$ and the downstream pressure $P_d$) is estimated as the diameter d of the holes. The diameter of the holes determined in a case of m=1 is the maximum value of the possible diameter of the hole, that is, the maximum hole diameter (maximum leakage hole diameter).

For example, it is assumed that combinations including ($P_u1$, $P_d1$), ($P_u2$, $P_d2$), and ($P_u3$, $P_d3$) are used as the combinations of the upstream pressure and the downstream pressure when the flow rate is measured using the test piece and that the flow rates obtained for the combinations are Q1, Q2, and Q3, respectively. Further, it is assumed that the diameters of the holes, each of which is determined by means of the approximation function corresponding to each combination of the upstream pressure and the downstream pressure, are d1, d2, and d3 corresponding to the flow rates per hole under the respective combinations of the upstream pressure and the downstream pressure. The flow rates Q1/m, Q2/m, and Q3/m per hole are obtained while increasing m by 1 from 1, and m is estimated as the number of the holes in the test piece when the difference between the maximum value and the minimum value of the diameters d1, d2, and d3 determined by means of the approximation function from the determined flow rate per hole is equal to or less than the predetermined threshold value Z. The average value of d1, d2, and d3 determined at this time is estimated as the diameter d of the holes. The maximum value, the minimum value, or the median value of d1, d2, and d3 may be estimated as the diameter of the holes. It is also possible to estimate the number of the holes and the diameter of the holes in a similar manner by measuring the flow rate while changing the type and the temperature of the gas, instead of changing the combination of upstream and downstream pressures, and then using the approximation function corresponding to a case of using the type and the temperature of the gas.

The used gas may be, for example, air, helium, hydrogen, oxygen, nitrogen, or the like.

Next, the overall configuration of the hole diameter estimation device 10 shown in FIG. 1 will be described. The hole diameter estimation device 10 includes a gas type setting unit 12, a gas temperature setting unit 14, a hole length setting unit 16, a pressure setting unit 18, a storage unit 20, a computation unit 22, a flow rate measurement instrument 24, and a display unit 26, so that the flow rate measurement instrument 24 can measure a flow rate Q of gas which flows through a hole formed in a test piece under predefined conditions, and a diameter d of the hole formed in the test piece can be estimated from the measured flow rate Q and displayed on the display unit 26. The gas is, for example, air, helium, hydrogen, oxygen, nitrogen, or the like.

The gas type setting unit 12 is configured so that an input device such as a touch panel or a keyboard, not shown, is used to input a type of the gas and a molecular weight M, a viscosity coefficient η[Pa·s], and a specific heat ratio γ are set in accordance with the input type of the gas. The gas type setting unit 12 may automatically set values of the molecular weight M, the viscosity coefficient η, and the specific heat ratio γ in accordance with the selected gas type, for example, when the gas type displayed on the touch panel or the like is selected, or may set values of the molecular weight M, the viscosity coefficient η, and the specific heat ratio γ which are directly input from the input device.

The gas temperature setting unit 14 sets a temperature T[K] of the gas which is input by means of the input device. The gas temperature T may be input as an absolute temperature [K] and set in the gas temperature setting unit 14, or may be input as a centigrade temperature [° C.] or a Fahrenheit temperature and converted by the temperature setting unit 14 into an absolute temperature [K], so that the converted absolute temperature is set in the gas temperature setting unit 14. Similarly, the hole length setting unit 16 also sets a value of a length l[m] of the hole which is input by means of the input device, and the pressure setting unit 18 also sets an upstream pressure $P_u$[Pa] and a downstream pressure $P_d$[Pa] of the hole (the pressure of the gas on the upstream side of the hole and the pressure of the gas on the downstream side the hole) which are input by means of the input device.

The storage unit 20 includes a relational expression storage unit 28 and an approximation function storage unit 30. The relational expression storage unit 28 stores in advance a relational expression in which calculation expressions for obtaining the flow rates in the molecular flow, the laminar flow, the turbulent flow, the critical flow, and the subcritical flow are combined. The relational expression is an expression in which eight parameters of the flow rate Q, the molecular weight M, the viscosity coefficient η, the specific heat ratio γ, and the temperature T of the gas, the diameter d[m] and the length l of the hole, and the upstream pressure $P_u$ and the downstream pressure $P_d$ of the hole are associated. Thus, by defining the values of the eight parameters, the flow rate Q can be calculated regardless of the state of the flow. As the relational expression, for example, Expression (1) described above is used. The approximation function storage unit 30 stores an approximation function approximating the correspondence relationship between the flow rate Q of the gas which flows through the hole and the diameter d of the hole obtained under each of one or a plurality of combinations of the upstream pressure $P_u$ and the downstream pressure $P_d$ of the hole. The approximation function is obtained in the following procedure by the computation unit 22.

First, the computation unit 22 obtains the correspondence relationship between the diameter d of the hole and the flow rate Q of the gas flowing through the hole by means of Relational Expression (1) stored in advance in the relational expression storage unit 28, while changing the diameter d of the hole, for each of one or the plurality of combinations of the upstream pressure $P_u$ and the downstream pressure $P_d$ of the hole which are set by the pressure setting unit 18, under the setting conditions of the molecular weight M, the viscosity coefficient η, the specific heat ratio γ of the gas set by the gas type setting unit 12 on the basis of the selected gas type, the temperature T of the gas set by the gas temperature setting unit 14, and the length l of the hole set by the hole length setting unit 16. Next, the computation unit 22 determines an approximation function approximating the obtained correspondence relationship between the diameter d and flow rate Q of the gas, and the determined approximation function is stored in the approximation function storage unit 30. The correspondence relationship between the diameter d and the flow rate Q of the gas can be approximated using, for example, a power function. The length l of the hole can be set, for example, under assumption that the length l is equal to the thickness W of the test piece described later.

The flow rate measurement instrument 24 measures the flow rate Q of the gas which passes through the hole of the test piece under a predefined condition, in a state where the test piece having the hole of an unknown diameter is placed therein, and outputs the measured flow rate Q to the computation unit 22. As the flow rate measurement instrument 24, a known flow rate measurement instrument such as an air leakage tester, a helium leakage detector, a mass flow meter, or a hydrogen detector can be used, as long as the flow rate Q of the gas passing through the hole of the test piece can be measured. Specifically, in the flow rate measurement instrument 24, the same gas as one selected when the approximation function is determined, that is, the type of the gas, which is set in the gas type setting unit 12 and has the molecular weight M, the viscosity coefficient η of the gas, and the specific heat ratio γ of the gas, is used to be set at the gas temperature T set by the gas temperature setting unit 14, and the flow rate Q of the gas passing through the hole of the test piece is measured, under each of one or the plurality of combinations of the upstream pressure $P_u$ and the downstream pressure $P_d$ of the hole which are set by the pressure setting unit 18. The upstream pressure $P_u$ and the downstream pressure $P_d$ are determined on the basis of the direction of the flow of the gas. For example, in a case where the test piece is a bag-shaped package, the inside of the package may be set at the upstream pressure $P_u$ and the outside of the package may be set at the downstream pressure $P_d$, and vice versa.

In addition to determining the above-described approximation function, the computation unit 22 is configured to use the approximation function stored in the approximation function storage unit 30 to calculates the corresponding diameter d of the hole from the flow rate Q of the hole of the test piece measured by the flow rate measurement instrument 24, sends the calculated diameter d to the display unit 26, and allows the display unit 26 to display the obtained diameter d of the hole as an estimated value of the diameter of the hole of the test piece. That is, the computation unit 22 serves as a hole diameter estimation unit.

In a case where the test piece has an unknown number m of holes, the test piece is used in the flow rate measurement instrument 24 to measure the flow rate Q of the gas, which flows through the holes of the test piece and has the molecular weight M, the viscosity coefficient η, the specific heat ratio γ, and the temperature T, for a plurality of combinations of the upstream pressure $P_u$ and the downstream pressure $P_d$. Further, in the computation unit 22, under assumption that the length l of each of the holes of the test piece is equal to the thickness W of the test piece, the correspondence relationships between the diameter d of the holes and the flow rate Q of the gas which flows through the holes are obtained by using Relational Expression (1) while changing the value of the diameter d of the holes, as well as, by using the same values of the molecular weight M, viscosity coefficient η, specific heat ratio γ, and temperature T as those of the gas used when measuring the flow rate of the test piece, for the plurality of combinations of the upstream pressure $P_u$ and the downstream pressure $P_d$ which are the same as the pressures when the test piece is used to measure the flow rate Q, and approximation functions are determined for the obtained correspondence relationships, respectively. Next, in the computation unit 22, under assumption that the number of the holes is m, for each of the plurality of combinations of the upstream pressure $P_u$ and the downstream pressure $P_d$, a value obtained by dividing the flow rate Q actually obtained using the test piece by m is defined as a flow rate per hole, and the diameter of the holes is determined by means of an approximation function corresponding to each combination of the upstream pressure $P_u$ and the downstream pressure $P_d$, while increasing the number of m by 1 from 1. Then, m is estimated as the number of the holes, when a difference between a maximum value and a minimum value of the diameter of the holes determined for each combination is equal to or less than a predetermined threshold. In addition, an average value of the diameters of the holes (the diameters of the holes determined under each combination of the upstream pressure $P_u$ and the downstream pressure $P_d$) is estimated as the diameter d of the holes. As described above, the maximum value, the minimum value, or the intermediate value of the diameter of the holes determined for each combination may be estimated as the diameter of the holes.

Figure 2:
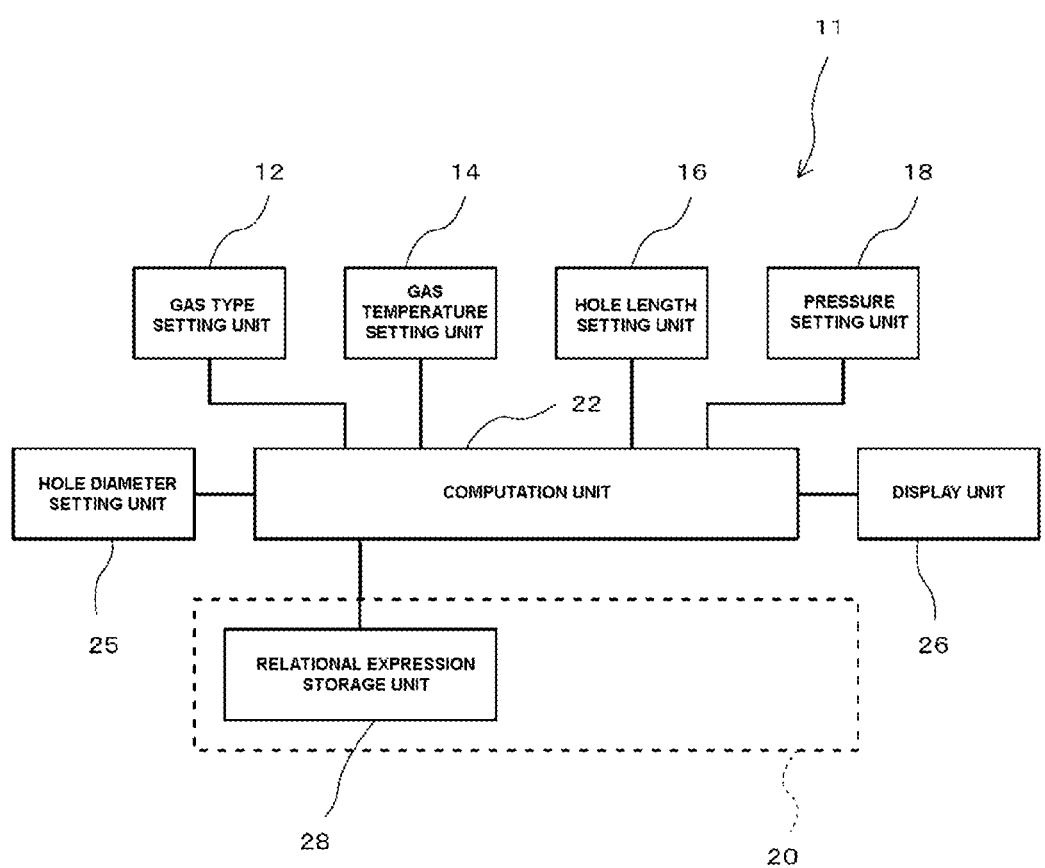
FIG. 2 is a block diagram showing an overall configuration of a gas flow rate estimation device using the gas flow rate estimation method according to the present invention.

Further, the hole diameter estimation device 10 shown in FIG. 1 can be made to serve as a gas flow rate estimation device by modifying a part of the hole diameter estimation device 10. FIG. 2 shows an overall configuration of a gas flow rate estimation device 11. In FIG. 2, the same reference numerals are given to components common to those of the hole diameter estimation device 10 shown in FIG. 1. Similarly to the hole diameter estimation device 10, the gas flow rate estimation device 11 includes a gas type setting unit 12, a gas temperature setting unit 14, a hole length setting unit 16, a pressure setting unit 18, a storage unit 20, and a computation unit 22, and a display unit 26, and further includes a hole diameter setting unit 25 in place of the flow rate measurement instrument 24 of the hole diameter estimation device 10. In the gas flow rate estimation device 11, the storage unit 20 requires no approximation function setting unit 30, but the approximation function setting unit 30 may be provided. Since the gas type setting unit 12, the gas temperature setting unit 14, the hole length setting unit 16, and the pressure setting unit 18 of the gas flow rate estimation device 11 are the same as those of the hole diameter estimation device 10, different components will be described below.

The hole diameter setting unit 25 sets the diameter d[m] of a hole which is input by means of an input device such as a touch panel or a keyboard (not shown). The computation unit 22 calculates a flow rate Q of gas by means of Relational Expression (1) stored in advance in the relational expression storage unit 28 of the storage unit 20, under setting condition of a molecular weight M of the gas, a viscosity coefficient η of the gas, a specific heat ratio γ of the gas which are set by the gas type setting unit 12 on the basis of the selected gas type, a gas temperature T set by the gas temperature setting unit 14, a length l of the hole set by the hole length setting unit 16, a diameter d of the hole set by the hole diameter setting unit 25, upstream pressure $P_u$ and downstream pressure $P_d$ of the hole set by the pressure setting unit 18. The flow rate Q obtained by the computation unit 22 is sent to the display unit 26 and displayed on the display unit 26 as an estimated value of the flow rate flowing through the hole under the above-described setting condition. Consequently, the computation unit 22 serves as a flow rate estimation unit.

Next, the relational expressions used in the gas flow rate estimation method, the hole diameter estimation method, the gas flow rate estimation device 11, and the hole diameter estimation device 10 described above will be described in more detail.

It has been known that a gas flow rate $Q_M[\text{Pa·m}^3/\text{s}]$ of the gas which flows through a cylindrical conduit having the diameter d[m] and the length l[m] as molecular flow is represented by the following Expression (2) from the kinetic theory of gas on the basis of the approximate expression of Santeler disclosed in NPL3 and so on.

[Math. 8]

$$Q_M = \frac{\pi d^2}{16}\sqrt{\frac{8RT}{\pi M}} \cdot \frac{4(l/d)+14}{3(l/d)^2+18(l/d)+14}(p_u - p_d), \quad (2)$$

where M is the molecular weight of the gas, T[K] is a temperature of the gas, and R is a gas constant, $P_u[\text{Pa}]$ is the upstream pressure, and $P_d[\text{Pa}]$ is the downstream pressure.

Further, a gas flow rate $Q_{VL}[\text{Pa·m}^3/\text{s}]$ of the gas which flows through the cylindrical conduit having the diameter d[m] and the length l[m] as laminar flow is represented by the following Expression (3) known as the Hagen-Poiseuille expression:

[Math. 9]

$$Q_{VL} = \frac{\pi d^4}{256\eta l}(p_u^2 - p_d^2), \quad (3)$$

where M is the molecular weight of the gas, η[Pa·s] is the viscosity coefficient of the gas, T[K] is the temperature of the gas, R is the gas constant, $P_u[\text{Pa}]$ is the upstream pressure, and $P_d[\text{Pa}]$ is the downstream pressure.

Further, a gas flow rate $Q_{TB}[\text{Pa·m}^3/\text{s}]$ of the gas which flows through the cylindrical conduit having the diameter d[m] and the length l[m] as turbulent flow is represented by the following Expression (4) obtained by substituting the Darcy-Weisbach expression and the Blasius expression for the relational expression between the flow rate of the gas and the flow velocity.

[Math. 10]

$$Q_{TB} = 1.015 d^{19/7}\left(\frac{\bar{v}^6}{\eta}\right)^{1/7}\left(\frac{p_u^2 - p_d^2}{l}\right)^{4/7} \quad (4)$$

$$\bar{v} = \sqrt{\frac{8RT}{\pi M}},$$

where M is the molecular weight of the gas, η[Pa·s] is the viscosity coefficient of the gas, T[K] is the temperature of the gas, R is the gas constant, $P_u[\text{Pa}]$ is the upstream pressure, and $P_d[\text{Pa}]$ is the downstream pressure.

It is determined whether the flow of the gas is critical flow or subcritical flow, by comparing the pressure ratio $P_d/P_u$, which is a ratio of the downstream pressure $P_d[\text{Pa}]$ to the upstream pressure $P_u[\text{Pa}]$ of an orifice or a short conduit with the critical pressure $(P_d/P_u)^*$ represented by the following expression. The flow of the gas is critical flow when the pressure ratio $P_d/P_u$ is equal to or less than the critical pressure ratio $(P_d/P_u)^*$, and the flow of the gas is subcritical flow when the pressure ratio $P_d/P_u$ is greater than the critical pressure ratio $(P_d/P_u)^*$.

[Math. 11]

$$\left(\frac{p_d}{p_u}\right)^* = \left(\frac{2}{\gamma+1}\right)^{\frac{\gamma}{\gamma-1}},$$

where $\gamma$ is the specific heat ratio of the gas.

It has been known that a flow rate $Q_{CR}[\text{Pa·m}^3/\text{s}]$ of the gas which flows through the cylindrical conduit having the diameter d[m] as critical flow and a flow rate $Q_{SC}[\text{Pa·m}^3/\text{s}]$ of the gas which flows through the cylindrical conduit having the diameter d[m] as subcritical flow are represented by the following expressions (5) and (6) on the basis of the gas state equation, thermodynamics, and Bernoulli's theorem of compressible fluid.

[Math. 12]

$$Q_{CR} = \frac{C_d p_u \pi d^2}{4}\sqrt{\frac{RT}{M}\gamma\left(\frac{2}{\gamma+1}\right)^{\frac{\gamma+1}{\gamma-1}}} \tag{5}$$

$$Q_{SC} = \frac{C_d p_u \pi d^2}{4}\sqrt{\frac{RT}{M}\frac{2\gamma}{\gamma-1}\left[\left(\frac{p_d}{p_u}\right)^{\frac{2}{\gamma}} - \left(\frac{p_d}{p_u}\right)^{\frac{\gamma+1}{\gamma}}\right]}, \tag{6}$$

where M is the molecular weight of the gas, $\gamma$ is the specific heat ratio of the gas, T[K] is the temperature of the gas, R is the gas constant, $P_u$[Pa] is the upstream pressure is, $P_d$[Pa] is the downstream pressure, and $C_d$ is a discharge coefficient. The discharge coefficient is a dimensionless number and corresponds to the ratio of the area of the contraction flow part to the actual opening area.

As described above, the expression representing the flow rate of the gas differs depending on the state of flow of the gas (that is, the region of the flow), and it is necessary to determine the flow state and then select the expression for obtaining the flow rate. Further, in the above-described known expressions, the necessary parameters differ depending on the state of the gas. Thus, in order to correspond to all the flow states, at least the following eight parameters are necessary: the diameter d[m] and the length l[m] of the hole, the molecular weight M, the viscosity coefficient η[Pa·s], the specific heat ratio $\gamma$, and the temperature T[K] of the gas, the upstream pressure $P_u$[Pa], and the downstream pressure $P_d$[Pa]. However, the expression for each flow state described above does not use the parameters used to represent the flow rates for the other flow states (that is, the parameters necessary to represent the flow rate for each state of the flow), and the expression for one flow state cannot be used in the other flow states. As a result, it is necessary to determine the flow state and select an appropriate expression.

On the other hand, Knudsen proposes the following Expression (7) (hereinafter referred to as "Knudsen expression") as a semi-empirical formula for obtaining a conductance $C_K$ of the flow, which is applicable to the region of the flow (the region including the intermediate flow) from the molecular flow to the laminar flow.

[Math. 13]

$$C_K = C_{VL} + C_{MI}\frac{1 + \sqrt{\frac{M}{RT}}\frac{d\bar{p}}{\eta}}{1 + 1.235\sqrt{\frac{M}{RT}}\frac{d\bar{p}}{\eta}} \tag{7}$$

-continued $$\bar{p} = \frac{p_u + p_d}{2}$$

$$C_{MI} = \frac{\pi d^3}{12l}\sqrt{\frac{8RT}{\pi M}}$$

$$C_{VL} = \frac{\pi d^4}{256\eta l}(p_u + p_d),$$

where d[m] is the diameter of the conduit, l[m] is the length, M is the molecular weight of the gas, η[Pa·s] is the viscosity coefficient, T[K] is the temperature, R is the gas constant, $P_u$[Pa] is the upstream pressure, $P_d$[Pa] is the downstream pressure, $C_{MI}$ is a molecular flow conductance, and $C_{VL}$ is a laminar flow conductance.

Further, Thomson and Owens propose the following Expression (8) (hereinafter referred to as "TO expression") as a semi-empirical formula for obtaining a conductance $C_{TO}$ applicable in a range from the slip flow to the molecular flow.

[Math. 14]

$$C_{TO} = C_{MI}\left(\frac{3\pi}{128}\cdot\frac{1}{Kn} + \frac{3\pi}{16}\cdot\frac{2-f}{f}\cdot\frac{1}{1+Kn} + \frac{Kn}{1+Kn}\right) \tag{8}$$

$$C_{MI} = \frac{\pi d^3}{12l}\sqrt{\frac{8RT}{\pi M}},$$

where d[m] is the diameter of the conduit, l[m] is the length thereof, M is the molecular weight of the gas, η[Pa·s] is the viscosity coefficient, T[K] is the temperature, R is the gas constant, $P_u$[Pa] is the upstream pressure, $P_d$[Pa] is the downstream pressure, Kn is a Knudsen number, and f is a ratio of gas molecules diffused and reflected on the wall surface.

Furthermore, Livesey proposes the following Expression (9) (hereinafter referred to as "Livesey expression") as an expression applicable to all flow regions.

[Math. 15]

$$Q_L = Q_C + \frac{Q_M}{1+\varphi(Kn)} \tag{9}$$

$$\varphi(Kn) = \varphi_s + (\varphi_1 - \varphi_s)\frac{1}{1+D_h}$$

$$\varphi_s = \frac{3\pi}{128Kn}, \quad \varphi_1 = \frac{3\pi(1+4Kn)}{128(1+Kn)Kn^{0.55}},$$

where l[m] is the length of the conduit, $Q_M[\text{Pa·m}^3/\text{s}]$ is a flow rate of the molecular flow, $Q_C[\text{Pa·m}^3/\text{s}]$ is a flow rate of the continuous flow, Kn is a Knudsen number, and $D_h$ is a hydraulic radius.

These expressions are applicable to a plurality of flow states. However, the Knudsen and TO expressions does not include all of eight parameters described above, that is, one or more of the parameters required to represent the flow rate in any of the states and therefore are not applicable to all of the flow states. Further, the Livesey expression uses complicated iterative calculation to determine the flow rate $Q_C$ of the continuous flow, and cannot be represented as one expression. The present inventors found that the following Expression (10) of the continuous flow, in which Expression (3) of the above-described laminar flow, Expression (4) of the turbulent flow, Expression (5) of the critical flow, and Expression (6) of the subcritical flow are combined, includes all eight parameters of the diameter d[m] and the length l[m] of the hole, the molecular weight M, the viscosity coefficient η[Pa·s], the specific heat ratio γ, and the temperature T[K] of the gas, the upstream pressure $P_u$[Pa], and the downstream pressure $P_d$[Pa], and that the flow rate $Q_C'$[Pa·m³/s] obtained by the following Expression (10) is highly consistent with the actual flow rate in all regions of the continuous flow.

[Math. 16]

$$Q_c' = \frac{Q_{CF}'}{\sqrt{\left(\frac{Q_{CF}'}{Q_{TB}'}\right)^2 + 1} \cdot \sqrt{\left(\frac{Q_{CF}'}{Q_{VL}'\sqrt{(Q_{CF}'/Q_{TB}')^2 + 1}}\right)^2 + 1}} \quad (10)$$

$$Q_{VL}' = \frac{\pi d^4}{256\eta(l + nd)}(p_u^2 - p_d^2)$$

$$Q_{TB}' = 1.015 d^{19/7} \left(\frac{\bar{v}^6}{\eta}\right)^{1-7} \left(\frac{p_u^2 - p_d^2}{l + nd}\right)^{4/7}$$

$$\bar{v} = \sqrt{\frac{8RT}{\pi M}}$$

$$Q_{CF}' = Q_{CF} - x$$

when $\left(\frac{p_d}{p_u}\right) \leq \left(\frac{2}{\gamma+1}\right)^{\frac{\gamma}{\gamma-1}}$ $$Q_{CF} = \frac{C_d p_u \pi d^2}{4} \sqrt{\frac{RT}{M}\gamma\left(\frac{2}{\gamma+1}\right)^{\frac{\gamma+1}{\gamma-1}}}$$

when $\left(\frac{p_d}{p_u}\right) > \left(\frac{2}{\gamma+1}\right)^{\frac{\gamma}{\gamma-1}}$ $$Q_{CF} = \frac{C_d p_u \pi d^2}{4} \sqrt{\frac{RT}{M}\frac{2\gamma}{\gamma-1}\left[\left(\frac{p_d}{p_u}\right)^{\frac{2}{\gamma}} - \left(\frac{p_d}{p_u}\right)^{\frac{\gamma+1}{\gamma}}\right]},$$

where n is a correction coefficient of a real number in the range of 0 to 1, x is an optional correction coefficient, $C_d$ is a discharge coefficient, and R is a gas constant.

As the discharge coefficient Ca used in Expression (10), for example, a value obtained from the following Empirical Formula (11) is usable.

[Math. 17]

$$C_d = 0.8623 - 0.2541\left(\frac{p_d}{p_u}\right) \quad (11)$$

The flow rate Q of the gas flowing through the flow passage is generally represented by $Q=C(P_u-P_d)$, where C is the conductance of the flow passage, $P_u$ is the upstream pressure, and $P_d$ is the downstream pressure. Therefore, the value obtained by multiplying the term of $C_{VL}$ in the Knudsen expression (7) by $(P_u-P_d)$ represents the flow rate $Q_{VL}$ of the gas in the laminar flow, and the value obtained by multiplying the term of $C_{Ml}$ in the Knudsen expression (7) by $(P_u-P_d)$ represents the flow rate $Q_M$ of the gas in the molecular flow. Thus, the Knudsen expression (7) is modified by using Expression (2) as the flow rate $Q_M$ of the gas in the molecular flow and using the $Q_C'$ obtained by Expression (10) instead of the term corresponding to the laminar flow rate $Q_{VL}$ in the Knudsen expression (7), so that the following Expression (12) is obtained. In the gas flow rate estimation method, the hole diameter estimation method, the gas flow rate estimation device 11, and the hole diameter estimation device 10 described above, Expression (12) is used as a relational expression. In a case where the Knudsen expression (7) is modified by using Expression (10), it is preferable that the correction coefficient n is set to 0.41 and the correction coefficient x is set to $Q_M/1.235$.

[Math. 18]

$$Q = Q_K' = Q_C' + Q_M \frac{1 + \sqrt{\frac{M}{RT}}\frac{d\bar{p}}{\eta}}{1 + 1.235\sqrt{\frac{M}{RT}}\frac{d\bar{p}}{\eta}} \quad (12)$$

However, an expression other than Expression (12) may be used as a relational expression in the gas flow rate estimation method, the hole diameter estimation method, the gas flow rate estimation device 11, and the hole diameter estimation device 10 according to the present invention, as long as the expression is modified by using Expression (10).

For example, in the TO expression (8), the first term on the right side corresponds to the laminar flow conductance $C_{VL}$, and the second and third terms on the right side correspond to the conductance of the intermediate flow and the molecular flow. Therefore, by using Expressions (2) and (10), the TO expression (8) is modified in the same manner as in the case of the modification of the Knudsen expression (7), so that the following Expression (13) is obtained.

[Math. 19]

$$Q = Q_{TO}' = Q_C' + Q_M\left(\frac{3\pi}{16} \cdot \frac{2-f}{f} \cdot \frac{1}{1+Kn} + \frac{Kn}{1+Kn}\right) \quad (13)$$

Further, the flow rate $Q_C'$ obtained by Expression (10) is used in the Livesey expression (9) instead of the term of the flow rate $Q_C$ of the continuous flow to modify the Livesey expression (9), so that the following Expression (14) is obtained.

[Math. 20]

$$Q = Q_L' = Q_C' + \frac{Q_M}{1 + \varphi(Kn)} \quad (14)$$

Expressions (13) and (14) obtained in such a manner can be also used as relational expressions in the gas flow rate estimation method, the hole diameter estimation method, the gas flow rate estimation device 11, and the hole diameter estimation device 10 according to the present invention. In Expression (13), the correction coefficient n is preferably 0.41 and the correction coefficient x is preferably $(3\pi Q_M(2-f))/16f$. In Expression (14), the correction coefficient n is preferably 0.41 and the correction coefficient x is preferably 0.

The Knudsen expression (7) and the TO expression (8) do not include eight parameters necessary to represent the flow rate in all states of the flow, that is, all of the diameter d[m] and the length l[m] of the hole, the molecular weight M, the viscosity coefficient η[Pa·s], the specific heat ratio γ, and the temperature T[K] of the gas, the upstream pressure $P_u$[Pa], and the downstream pressure $P_d$[Pa], and reliability is therefore insufficient. Further, the Livesey expression (9) is not practical since the expression uses a complicated iterative calculation to obtain the flow rate $Q_C$ of the continuous flow. However, Expressions (12), (13), and (14) are results from the Knudsen expression (7), the TO expression (8), and the Livesey expression (9) being modified by using Expression (10), which is highly consistent with the actual flow rate in all regions of the continuous flow and includes eight parameters of the diameter d[m] and the length l[m] of the hole, the molecular weight M, the viscosity coefficient η[Pa·s], the specific heat ratio γ, and temperature T[K] of the gas, the upstream pressure $P_u$[Pa], and the downstream pressure $P_d$[Pa]. Therefore, Expressions (12), (13), and (14) are applicable to all states of the flow without determining the states of the flow.

EXAMPLE

In ISO6358-1: 2013 relating to the field of air conditioning equipment, a sonic conductance $C_S$ is adopted as a characteristic parameter for calculating the gas flow rate, and the flow rate $Q_{CR}$ in critical flow is represented by the following Expression (15) when the unit of the flow rate is converted to Pa·m³/s, where the temperature of the gas is T, the reference temperature (20° C.) of the gas is $T_0$, the upstream pressure is $P_u$, and the downstream pressure is $P_d$.

[Math. 21]

$$Q_{CR} = 10^5 p_u C_S \sqrt{\frac{T_0}{T}} \quad (15)$$

Further, the AnnexG of ISO 6358-1: 2013 shows measurement results of the sonic conductances $C_S$ of 12 flexible tubes (having inner diameters of 2.5 to 6.6 mm, lengths of 0.1 to 20 m) in a case that the upstream pressure $P_u$ is 500 kPa and the downstream pressure $P_d$ is 100 kPa, and shows, from these measurement results, Empirical Formula (16) of the sonic conductance $C_S$, where the inner diameter of the tube is d[m], the length is l[m], and the opening area is A[m²].

[Math. 22]

$$C_S = \frac{0.002A}{\sqrt{\frac{20l}{(10^3 d)^{1.31}} + 1}} \quad (16)$$

Since Expression (16) is an empirical formula, the values obtained from Expression (15) and Expression (16), when setting the upstream pressure $P_u$, the downstream pressure $P_d$, the inner diameter d, the length l, and the opening area A of the tube to the same as in the experimental conditions, coincide with the experimental results.

Further, Santeler proposes, as an expression that can be used when the flow rate Q[Pa·m³/s] representing the transition from the laminar flow to the critical flow is obtained, the following Expression (17) (hereinafter, referred to as "Santeler expression"), where the diameter of the holes is d[m], the length thereof is l[m], the viscosity coefficient of the gas is η[Pa·s], the specific heat ratio is γ, the temperature of the gas is T[K], the gas constant is R, the upstream pressure is $P_u$[Pa], the downstream pressure is $P_d$[Pa], and the discharge coefficient is $C_d$.

[Math. 23]

$$Q = \frac{K_{CR}^2}{2K_{VL}} \left[ \sqrt{1 + \left(\frac{2K_{VL} \cdot p_u}{K_{CR}}\right)^2} - 1 \right] \quad (17)$$

$$K_{VL} \equiv \frac{\pi d^4}{256 \eta l}$$

$$K_{CR} \equiv \frac{C_d \pi d^2}{4} \sqrt{\frac{RT}{M} \gamma \left(\frac{2}{\gamma+1}\right)^{\frac{\gamma+1}{\gamma-1}}}$$

Figure 3:
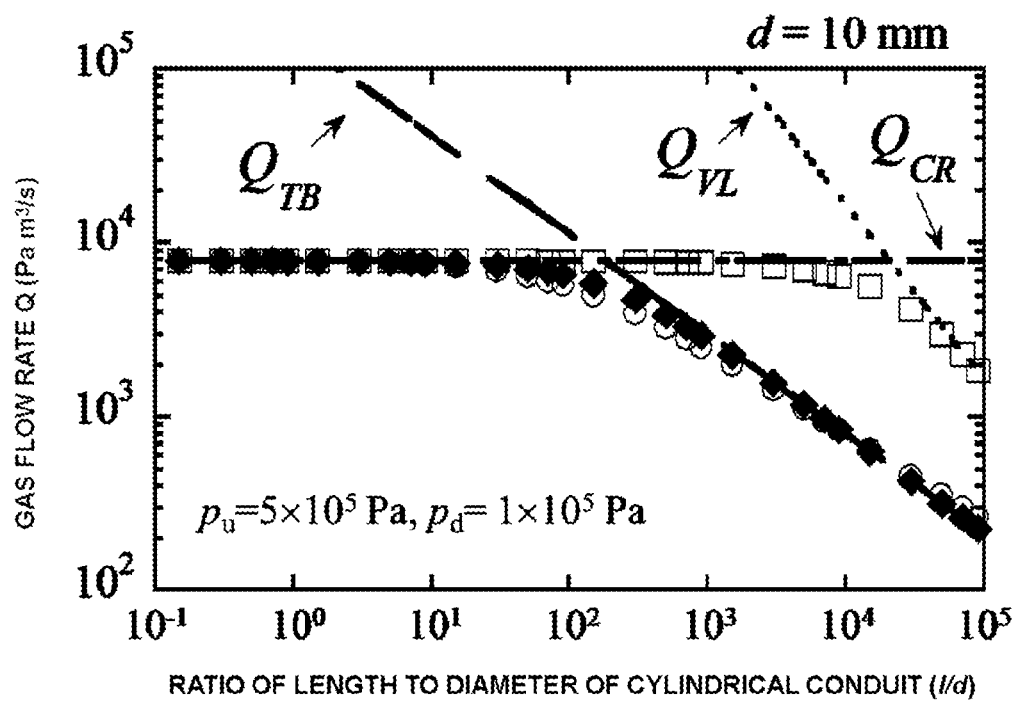
FIG. 3 is a graph for comparing and explaining flow rates calculated by means of a relational expression used in the gas flow rate estimation method according to the present invention and flow rates obtained from a known expression applicable to each flow region.
Figure 4:
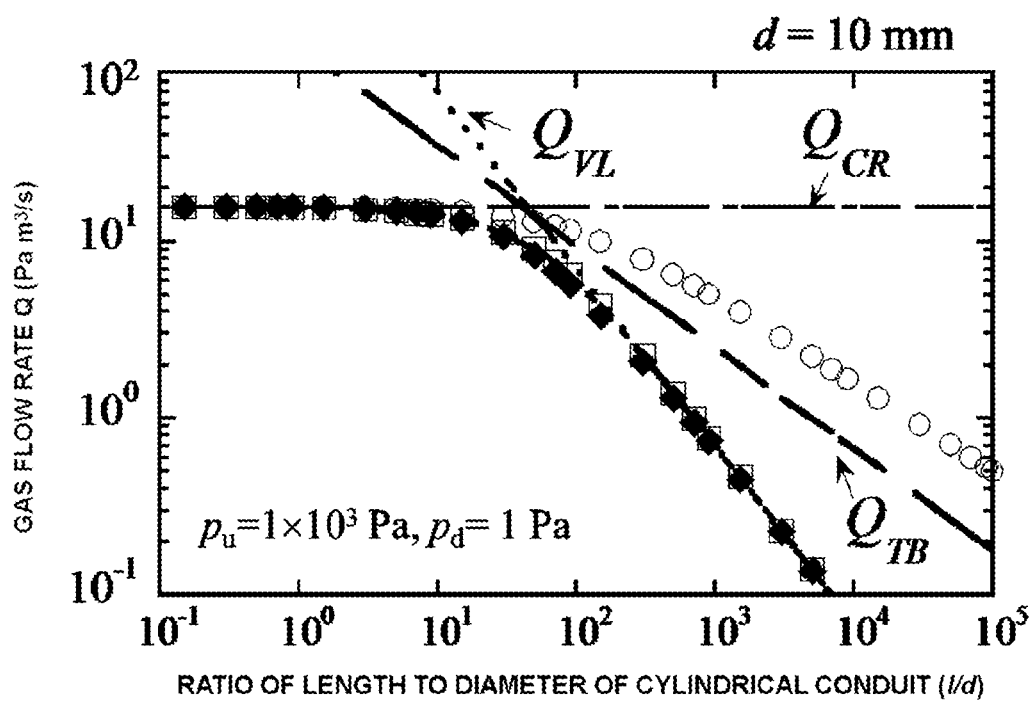
FIG. 4 is a graph for comparing and explaining flow rates calculated by means of the relational expression used in the gas flow rate estimation method according to the present invention and flow rates obtained from the known expression applicable in each flow region.

FIGS. 3 and 4 are graphs illustrating the correspondence relationship between l/d and the flow rate Q[Pa·m³/s] obtained from Expression (10) and the correspondence relationship between l/d and the flow rate Q[Pa·m³/s] obtained from Expressions (15), (16), and (17), when the diameter of the hole is d[m], the length thereof is l[m], and the correction coefficients n=0 and x=0. In FIGS. 3 and 4, points indicated by the symbol "o" show the relationship between l/d and the flow rate Q which is obtained from Expressions (15) and (16), points indicated by the symbol "□" show the relationship between l/d and the flow rate Q which is obtained from the Santeler expression, that is, Expression (17) being able to express the transition from the laminar flow to the critical flow, and points indicated by the symbol "♦" show the relationship between l/d and the flow rate Q obtained from Expression (10) used in the present invention. Further, each point in FIG. 3 shows a value calculated from each expression under the conditions of upstream pressure $P_u$=5×10⁵ Pa, downstream pressure $P_d$=1×10⁵ Pa, and diameter d of the hole=10 mm, and each point in FIG. 4 shows a value calculated from each expression under the conditions of the upstream pressure $P_u$=1×10³ Pa, the downstream pressure $P_d$=1 Pa, and the diameter d of the hole=10 mm. Furthermore, FIGS. 3 and 4 illustrate, for comparison, a straight line indicating the relationship between l/d and the flow rate $Q_{VL}$ in the laminar flow which is obtained from Expression (3), a straight line indicating the relationship between l/d and the flow rate $Q_{TB}$ in the turbulent flow which is obtained from Expression (4), and a straight line indicating the relationship between l/d and the flow rate $Q_{CR}$ in the critical flow which is obtained from Expression (5).

As shown in FIG. 3, it can be seen that, under the condition of the upstream pressure $P_u$=5×10⁵ Pa, the downstream pressure $P_d$=1×10⁵ Pa, and the diameter d of the hole=10 mm, the relationship (symbol "♦") between the l/d and the flow rate Q, which is obtained from Expression (10) used in the present invention, substantially coincides with the relationship (symbol "o") between the l/d and the flow rate Q, which is obtained from Expression (15) by using the solution of the Empirical Formula (16) of the sonic conductance, that is, the experimental results. Further, as shown in FIG. 4, it can be seen that, under the condition of upstream pressure $P_u$=1×10³ Pa, the downstream pressure $P_d$=1 Pa, and the diameter d of the hole=10 mm, the relationship (symbol "♦") between the l/d and the flow rate Q, which is obtained from Expression (10) used in the present invention, satisfactorily coincides with the Santeler expression, that is, the solution (symbol "□") of Expression (17). This is because the Reynolds number Re is 1340 or less under the calculation condition in FIG. 4 so that the transition from the critical flow to the laminar flow is caused without becoming the turbulent flow. Therefore, it can be said that the result obtained from Expression (10) appropriately shows the state of the flow. As described above, it can be seen that Expression (10) in which the expressions of the laminar flow, turbulent flow, critical flow, and subcritical flow are combined can give an appropriate flow rate value for the continuous flow which flows through a cylindrical conduit-like hole having an arbitrary length without using the Reynolds number Re and the Mach number Ma to determine the flow region. Therefore, it can be seen that Expressions (11), (13), and (14), which are obtained by using Expression (10) instead of the term for the continuous flows to modifying the Knudsen expression (7), the TO expression (8), and the Livesey expression (9), can give an appropriate flow rate value for the continuous flow which flows through a cylindrical conduit-like hole having an arbitrary length without using the Reynolds number Re or the Mach number Ma to determine the flow region such as the molecular flow, laminar flow, turbulent flow, critical flow, and subcritical flow.

Tables 1 and 2 provided below comparatively show a diameter of the hole estimated from measured flow rates Q by using Relational Expression (12) and following the procedure of the above-described hole diameter estimation method according to the present invention, and a diameter of the hole estimated from measured flow rates Q by following the same procedure of the above-described hole diameter estimation method and using Expression (3) or the Hagen Poiseuil expression, which is often used to calculate the amount of leakage in the gas leakage test, instead of Relational Expression (12), regarding a sample 1, which has a hole with a diameter of 5.0 µm and has a thickness of 5 µm, and a sample 2, which has a hole with a diameter of 49.0 µm and has a thickness of 5 µm. Each of the flow rates Q was measured under the condition where air is as the test gas and the secondary pressure (downstream pressure) was set to atmospheric pressure while the primary pressure (upstream pressure) was changed in the range of 10 to 100 kPa. Table 1 shows the results in a case where the sample 1 was used, and Table 2 shows the results in a case where the sample 2 was used.

From Tables 1 and 2, as compared with the case where Expression (3) which is the Hagen-Poiseuil expression is used as the relational expression, it can be seen that errors between the estimated diameter of the hole and the actual diameter of the hole are small for both samples having the holes of different sizes, when Expression (12) which is the relational expression used in the hole diameter estimation method according to the present invention is used, and therefore the diameter of the hole can be more accurately estimated when the hole estimation method according to the present invention is used.

Although the gas flow rate estimation method, the hole diameter estimation method using the gas flow rate estimation method, the gas flow rate estimation device, and the hole diameter estimation device according to the present invention have been described above with reference to the embodiments, the present invention is not limited to the above-described embodiments. In the above description, as the relational expression in the gas flow rate estimation method, Expressions (12), (13), and (14) have been described to be used, which are obtained by using Expression (10) to modify the Knudsen expression (7), the TO expression (8), and the Livesey expression (9). However, it is possible to use, as the relational expression, any expression including all the eight parameters necessary to represent the flow rate in all regions of the flow of the gas, that is, the diameter $d[m]$ and the length $l[m]$ of the hole, and the molecular weight M, the viscosity coefficient $\eta[Pa \cdot s]$, the specific heat ratio $\gamma$, the temperature $T[K]$, the upstream pressure $P_u[Pa]$, and the downstream pressure $P_d[Pa]$ of the gas.

REFERENCE SIGNS LIST 10 hole diameter estimation device
11 gas flow rate estimation device
12 gas type setting unit

TABLE 1

| | | Expression used in the present invention | | | Hagen-Poiseuil expression | | |
|---|---|---|---|---|---|---|---|
| Test pressure (kPa) | Amount of leakage Q (Pa · m³/s) | Calculated hole diameter (µm) | Difference (calculated value − measured value) | Relative ratio (calculated value/ measured value) | Calculated hole diameter (µm) | Difference (calculated value − measured value) | Relative ratio (calculated value/ measured value) |
| 10 | $7.92 \times 10^{-5}$ | 5.0 | 0.0 | 1.01 | 5.3 | 0.3 | 1.06 |
| 15 | $1.16 \times 10^{-4}$ | 5.0 | 0.0 | 1.00 | 5.3 | 0.3 | 1.05 |
| 20 | $1.45 \times 10^{-4}$ | 4.9 | −0.1 | 0.99 | 5.1 | 0.1 | 1.03 |
| 40 | $2.43 \times 10^{-4}$ | 4.8 | −0.2 | 0.95 | 4.8 | −0.2 | 0.96 |
| 60 | $3.41 \times 10^{-4}$ | 4.8 | −0.2 | 0.97 | 4.6 | −0.4 | 0.93 |
| 80 | $4.08 \times 10^{-4}$ | 4.2 | −0.8 | 0.85 | 4.4 | −0.6 | 0.89 |
| 100 | $4.79 \times 10^{-4}$ | 4.3 | −0.7 | 0.86 | 4.3 | −0.7 | 0.86 |

TABLE 2

| | | Expression used in the present invention | | | Hagen-Poiseuil expression | | |
|---|---|---|---|---|---|---|---|
| Test pressure (kPa) | Amount of leakage Q (Pa · m³/s) | Calculated hole diameter (µm) | Difference (calculated value − measured value) | Relative ratio (calculated value/ measured value) | Calculated hole diameter (µm) | Difference (calculated value − measured value) | Relative ratio (calculated value/ measured value) |
| 10 | $2.02 \times 0^{-2}$ | 40.0 | −9.0 | 0.82 | 21.3 | −27.7 | 0.43 |
| 15 | $2.50 \times 10^{-2}$ | 42.9 | −6.1 | 0.88 | 20.1 | −28.9 | 0.41 |
| 20 | $2.93 \times 10^{-2}$ | 45.3 | −3.7 | 0.93 | 19.4 | −29.6 | 0.40 |
| 40 | $4.19 \times 10^{-2}$ | 51.2 | 2.2 | 1.04 | 17.4 | −31.6 | 0.36 |
| 60 | $5.19 \times 10^{-2}$ | 52.1 | 3.1 | 1.06 | 16.3 | −32.7 | 0.33 |
| 80 | $6.02 \times 10^{-2}$ | 46.4 | −2.6 | 0.95 | 15.5 | −33.5 | 0.32 |
| 100 | $6.81 \times 10^{-2}$ | 46.9 | −2.1 | 0.96 | 14.8 | −34.2 | 0.30 |

14 gas temperature setting unit
16 hole length setting unit
18 pressure setting unit
20 storage unit
22 computation unit
24 flow rate measurement instrument
25 hole diameter setting unit
26 display unit
28 relational expression storage unit
30 approximation function storage unit

The invention claimed is:

1. A gas flow rate estimation method, comprising:
determining a flow rate of gas flowing through a hole by a computation unit, based on a type of the gas flowing through the hole, pressures upstream and downstream from the hole, and information about the hole, wherein
the flow rate of the gas is determined by the computation unit, regardless of a state of flow of the gas, from a molecular weight, a viscosity coefficient, and a specific heat ratio of the gas, a diameter and a length of the hole, and the upstream and downstream pressures of the gas flowing through the hole, based on a predetermined relational expression including, as parameters, all of the flow rate of the gas, the diameter of the hole, the length of the hole, the upstream and downstream pressures of the hole, a temperature of the gas, the molecular weight of the gas, the viscosity coefficient of the gas, and the specific heat ratio of the gas, and
the predetermined relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

where Qc is the flow rate of the gas under assumption of continuous flow, $Q_{VL}$ is the flow rate of the gas under assumption of laminar flow, $Q_{TB}$ is the flow rate of the gas under assumption of turbulent flow, and $Q_{CF}'$ is the flow rate of the gas under assumption of compressible flow.

2. The gas flow rate estimation method according to claim 1, wherein
the predetermined relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

$$Q_{TB} = 1.015 d^{19/7} \left(\frac{\bar{v}^\delta}{\eta}\right)^{1/7} \left(\frac{p_u^2 - p_d^2}{l + nd}\right)^{4/7}$$

$$\bar{v} = \sqrt{\frac{8RT}{\pi M}}$$

$$Q_{VL} = \frac{\pi d^4}{256\eta(l + nd)}(p_u^2 - p_d^2)$$

$$Q'_{CF} = Q_{CF} - x$$

when $\left(\frac{p_d}{p_u}\right) \leq \left(\frac{2}{\gamma+1}\right)^{\frac{\gamma}{\gamma-1}}$ -continued $$Q_{CF} = \frac{C_d p_u \pi d^2}{4}\sqrt{\frac{RT}{M}\gamma\left(\frac{2}{\gamma+1}\right)^{\frac{\gamma+1}{\gamma-1}}}$$

when $\left(\frac{p_d}{p_u}\right) > \left(\frac{2}{\gamma+1}\right)^{\frac{\gamma}{\gamma-1}}$ $$Q_{CF} = \frac{C_d p_u \pi d^2}{4}\sqrt{\frac{RT}{M}\frac{2\gamma}{\gamma-1}\left[\left(\frac{p_u}{p_d}\right)^{\frac{2}{\gamma}} - \left(\frac{p_d}{p_u}\right)^{\frac{\gamma+1}{\gamma}}\right]},$$

where Qc is the flow rate of the gas under assumption of continuous flow, d is the diameter of the hole, l is the length of the hole, T is the temperature of the gas, M is the molecular weight of the gas, η is the viscosity coefficient of the gas, γ is the specific heat ratio of the gas, $P_u$ is the upstream pressure of the hole, $P_d$ is the downstream pressure of the hole, $C_d$ is a discharge coefficient, R is a gas constant, and n and x are correction coefficients.

3. The gas flow rate estimation method according to claim 2, wherein
the predetermined relational expression is the following expression:

$$Q = Q_C + Q_M \frac{1 + \sqrt{\frac{M}{RT}\frac{d\bar{p}}{\eta}}}{1 + 1.235\sqrt{\frac{M}{RT}\frac{d\bar{p}}{\eta}}}$$

$$\bar{p} = \frac{p_u + p_d}{2}$$

$$Q_M = \frac{\pi d^2}{16}\sqrt{\frac{8RT}{\pi M}} \cdot \frac{4(l/d) + 14}{3(l/d)^2 + 18(l/d) + 14}(p_u - p_d).$$

4. The gas flow rate estimation method according to claim 1, wherein
the gas is selected from a group consisting of air, helium, hydrogen, oxygen, and nitrogen.

5. A hole diameter estimation method for determining a diameter of a hole by a computation unit, based on a type and a temperature of gas flowing through the hole, pressures upstream and downstream from the hole, and a flow rate of the gas flowing through the hole, said hole diameter estimation method comprising:
a step of obtaining a correspondence relationship between the diameter of the hole and the flow rate of the gas flowing through the hole, by setting conditions of the type and temperature of the gas, a length of the hole, and the upstream and downstream pressures of the hole, and using a predetermined relational expression under the setting conditions;
a step of determining an approximation function approximating the correspondence relationship, which is obtained under the setting conditions, between the diameter of the hole and the flow rate of the gas flowing through the hole;
a step of providing a test piece having a hole of an unknown diameter;
a step of measuring the flow rate of the gas passing through the hole of the test piece under the setting conditions; and
a step of estimating the diameter of the hole by the computation unit, based on the measured flow rate of the gas and the approximation function, wherein the predetermined relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

where Qc is the flow rate of the gas under assumption of continuous flow, $Q_{VL}$ is the flow rate of the gas under assumption of laminar flow, $Q_{TB}$ is the flow rate of the gas under assumption of turbulent flow, and $Q_{CF}'$ is the flow rate of the gas under assumption of compressible flow.

6. The hole diameter estimation method according to claim 5, wherein
the predetermined relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

$$Q_{TB} = 1.015 d^{19/7} \left(\frac{\bar{v}^\delta}{\eta}\right)^{1/7} \left(\frac{p_u^2 - p_d^2}{l + nd}\right)^{4/7}$$

$$\bar{v} = \sqrt{\frac{8RT}{\pi M}}$$

$$Q_{VL} = \frac{\pi d^4}{256\eta(l + nd)}(p_u^2 - p_d^2)$$

$$Q'_{CF} = Q_{CF} - x$$

when $\left(\frac{p_d}{p_u}\right) \leq \left(\frac{2}{\gamma + 1}\right)^{\frac{\gamma}{\gamma - 1}}$ $$Q_{CF} = \frac{C_d p_u \pi d^2}{4}\sqrt{\frac{RT}{M}\gamma\left(\frac{2}{\gamma + 1}\right)^{\frac{\gamma + 1}{\gamma - 1}}}$$

when $\left(\frac{p_d}{p_u}\right) > \left(\frac{2}{\gamma + 1}\right)^{\frac{\gamma}{\gamma - 1}}$ $$Q_{CF} = \frac{C_d p_u \pi d^2}{4}\sqrt{\frac{RT}{M}\frac{2\gamma}{\gamma - 1}\left[\left(\frac{p_u}{p_d}\right)^{\frac{2}{\gamma}} - \left(\frac{p_d}{p_u}\right)^{\frac{\gamma + 1}{\gamma}}\right]},$$

where Qc is the flow rate of the gas under assumption of continuous flow, d is the diameter of the hole, l is the length of the hole, T is the temperature of the gas, M is the molecular weight of the gas, $\eta$ is the viscosity coefficient of the gas, $\gamma$ is the specific heat ratio of the gas, $P_u$ is the upstream pressure of the hole, $P_d$ is the downstream pressure of the hole, $C_d$ is a discharge coefficient, R is a gas constant, and n and x are correction coefficients.

7. The hole diameter estimation method according to claim 6, wherein
the predetermined relational expression is the following expression:

$$Q = Q_C + Q_M \frac{1 + \sqrt{\frac{M}{RT}}\frac{d\bar{p}}{\eta}}{1 + 1.235\sqrt{\frac{M}{RT}\frac{d\bar{p}}{\eta}}}$$

$$\bar{p} = \frac{p_u + p_d}{2}$$

$$Q_M = \frac{\pi d^2}{16}\sqrt{\frac{8RT}{\pi M}} \cdot \frac{4(l/d) + 14}{3(l/d)^2 + 18(l/d) + 14}(p_u - p_d).$$

8. The hole diameter estimation method according to claim 5, wherein the gas is selected from a group consisting of air, helium, hydrogen, oxygen, and nitrogen.

9. The hole diameter estimation method according to claim 5,
wherein in the step of obtaining the correspondence relationship, the type and temperature of the gas and the length of the hole are set in advance, and the predetermined relational expression is used to obtain correspondence relationships between the diameter of the hole and the flow rate of the gas flowing through the hole under a plurality of combinations of the upstream and downstream pressures of the hole, and in the step of determining the approximation function, the approximation function approximating each of the correspondence relationships, which are obtained under the plurality of combinations of the upstream and downstream pressures of the hole, between the diameter of the hole and the gas flowing through the hole, is determined, and
the hole diameter estimation method further comprises a step of, in a case where an unknown number m of holes having the length is formed in the test piece, using the set type of the gas and measuring the flow rate of the gas passing through the holes of the test piece for the plurality of combinations of the upstream and downstream pressures, under the set temperature of the gas, thereby determining the diameter of the holes by using the approximation function under assumption that a value, obtained by dividing each flow rate measured for each of the combinations of the upstream and downstream pressures by m, is defined as a flow rate per hole to estimate m as the number of the holes when a difference between a maximum value and a minimum value of the diameters of the holes determined in each combination is equal to or less than a predefined threshold value.

10. A gas flow rate estimation device for determining a flow rate of gas flowing through a hole from a type of the gas flowing through the hole, pressures upstream and downstream from the hole, and information about the hole, said gas flow rate estimation device comprising:
a gas type setting unit setting a molecular weight of the gas, a viscosity coefficient of the gas, and a specific heat ratio of the gas, based on a selected type of the gas;
a gas temperature setting unit setting a temperature of the gas;
a hole length setting unit setting a length of the hole;
a hole diameter setting unit setting a diameter of the hole;
a pressure setting unit setting the pressures upstream and downstream from the hole;
a storage unit storing a relational expression including, as parameters, all of the flow rate of the gas, the diameter of the hole, the length of the hole, the upstream and downstream pressures of the hole, a temperature of the gas, the molecular weight of the gas, the viscosity coefficient of the gas, and the specific heat ratio of the gas; and
a computation unit using the relational expression stored in the storage unit to calculate the flow rate of the gas flowing through the hole, based on the molecular weight, the viscosity coefficient and the specific heat ratio of the gas of the type set by the gas type setting unit, the temperature set by the gas temperature setting unit, the length of the hole set by the hole length setting unit, the diameter of the hole set by the hole diameter setting unit, and the upstream and downstream pressures of the hole set by the pressure setting unit, wherein the relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

where Qc is the flow rate of the gas under assumption of continuous flow, $Q_{VL}$ is the flow rate of the gas under assumption of laminar flow, $Q_{TB}$ is the flow rate of the gas under assumption of turbulent flow, and $Q_{CF}'$ is the flow rate of the gas under assumption of compressible flow.

11. A hole diameter estimation device for estimating a diameter of a hole formed in a test piece, said hole diameter estimation device comprising:
a gas type setting unit setting a molecular weight of gas, a viscosity coefficient of the gas, and a specific heat ratio of the gas, based on a selected type of the gas;
a gas temperature setting unit setting a temperature of the gas;
a hole length setting unit setting a length of the hole;
a pressure setting unit setting pressures upstream and downstream from the hole;
a storage unit storing an approximation function approximating a correspondence relationship between the diameter of the hole and a flow rate of the gas flowing through the hole, said correspondence relationship being obtained by using a relational expression under setting conditions of the molecular weight, the viscosity coefficient and the specific heat ratio of the gas of the type set by the gas type setting unit, the temperature set by the gas temperature setting unit, the length of the hole set by the hole length setting unit, and the upstream and downstream pressures of the hole set by the pressure setting unit;
a flow rate measurement unit measuring the flow rate of the gas passing through the hole of the test piece in a state where the upstream and downstream pressures set in the pressure setting unit are generated inside and outside the test piece, by placing the test piece inside the flow rate measurement unit and using the selected type of the gas at the temperature set in the gas temperature setting unit; and a computation unit calculating the diameter of the hole, based on the flow rate measured by the flow rate measurement unit under the setting conditions and the approximation function stored in the storage unit, wherein the relational expression includes Qc represented by the following expression:

$$Q_C = \frac{Q'_{CF}}{\sqrt{\left(\frac{Q'_{CF}}{Q_{TB}}\right)^2 + 1} \cdot \sqrt{\left(\frac{Q'_{CF}}{Q_{VL}\sqrt{(Q'_{CF}/Q_{TB})^2 + 1}}\right)^2 + 1}},$$

where Qc is the flow rate of the gas under assumption of continuous flow, $Q_{VL}$ is the flow rate of the gas under assumption of laminar flow, $Q_{TB}$ is the flow rate of the gas under assumption of turbulent flow, and $Q_{CF}'$ is the flow rate of the gas under assumption of compressible flow.

12. The hole diameter estimation device according to claim 11,
wherein the storage unit stores the approximation function approximating the correspondence relationship between the diameter of the hole and the flow rate of the gas flowing through the hole for each of a plurality of combinations of the upstream and downstream pressures of the hole set by the pressure setting unit, said correspondence relationship being obtained by using the relational expression under setting conditions of the molecular weight, the viscosity coefficient and the specific heat ratio of the gas of the type set by the gas type setting unit, the temperature set by the gas temperature setting unit, and the length of the hole set by the hole length setting unit, and
in a case where an unknown number m of holes having the length is formed in the test piece, the hole diameter estimation unit uses the selected type of the gas at the temperature set in the gas temperature setting unit and measures the flow rate of the gas passing through the holes of the test piece under the plurality of combinations of the upstream and downstream pressures, thereby determining the diameter of the holes by using the approximation function under assumption that a value, obtained by dividing each flow rate measured in each combination of the upstream and downstream pressures by m, is defined as a flow rate per hole to estimate m as the number of the holes when a difference between a maximum value and a minimum value of the diameter of the holes determined in each combination is equal to or less than a predefined threshold value.

* * * * *